(12) United States Patent
Ahmed et al.

(10) Patent No.: US 9,893,649 B2
(45) Date of Patent: Feb. 13, 2018

(54) THREE WIRE DC TRANSMISSION CIRCUIT WITH MODULATED POLE

(71) Applicants: QATAR FOUNDATION FOR EDUCATION, SCIENCE AND COMMUNITY DEVELOPMENT, Doha (QA); QATAR UNIVERSITY, Al Tarfa, Doha (QA)

(72) Inventors: Shehab Ahmed, Doha (QA); Ahmed A. Elserougi, Doha (QA); Ahmed M. Massoud, Doha (QA); Ayman S. Abdel-Khalik, Houston, TX (US)

(73) Assignee: QATAR UNIVERSITY, Al Tarfa, Doha (QA)

( * ) Notice: Subject to any disclaimer, the term of this patent is extended or adjusted under 35 U.S.C. 154(b) by 0 days.

(21) Appl. No.: 15/333,136

(22) Filed: Oct. 24, 2016

(65) Prior Publication Data
US 2017/0117817 A1 Apr. 27, 2017

Related U.S. Application Data

(60) Provisional application No. 62/245,205, filed on Oct. 22, 2015.

(51) Int. Cl.
*H02M 7/155* (2006.01)
*H02M 7/757* (2006.01)
(Continued)

(52) U.S. Cl.
CPC ............. *H02M 7/7575* (2013.01); *H02J 1/08* (2013.01); *H02J 3/02* (2013.01); *H02J 4/00* (2013.01)

(58) Field of Classification Search
CPC .. H02M 7/155; H02M 7/1552; H02M 7/1555; H02M 7/217; H02M 7/757; H02M 7/7575; H02M 7/797; H02J 1/08
See application file for complete search history.

(56) References Cited

U.S. PATENT DOCUMENTS 4,459,492 A * 7/1984 Rogowsky ............... H02J 3/36
                                                              307/82
6,141,226 A   10/2000 Halvarsson et al.
(Continued)

FOREIGN PATENT DOCUMENTS

CN           103595064 A * 10/2013 ............. Y02E 60/60

OTHER PUBLICATIONS

Clerici et al., "HVDC conversion of HVAC lines to provide substantial power upgrading," IEEE Transactions on Power Delivery, vol. 6, Issue 1, pp. 324-333, Jan. 1991.

*Primary Examiner* — Gary L Laxton
*Assistant Examiner* — Peter Novak
(74) *Attorney, Agent, or Firm* — Richard C. Litman

(57) ABSTRACT

The method of converting high voltage AC lines into bipolar high voltage DC systems makes use of the three transmission lines (referred to as the positive pole, the negative pole, and the modulating pole) in an existing high voltage AC system as transmission lines in a bipolar high voltage DC system. When current from the power source is up to the thermal current limit of the transmission lines, the transmission lines operate in two-wire mode, where current is delivered in the positive pole and returned in the negative pole, the modulating pole being open. When power source current exceeds the thermal current limit, operation is in three-wire mode, alternating for predetermined periods between parallel configuration of the positive pole and the modulating pole to divide current for delivery to the load, and parallel configuration of the negative pole and the modulating pole, dividing the return current.

10 Claims, 16 Drawing Sheets

(51) Int. Cl.
    *H02J 1/08*           (2006.01)
    *H02J 3/02*           (2006.01)
    *H02J 4/00*           (2006.01)

(56) References Cited

U.S. PATENT DOCUMENTS

| | | | |
|---|---|---|---|
| 8,289,736 B2* | 10/2012 | Asplund | H02J 3/36 |
| | | | 363/127 |
| 8,471,416 B2 | 6/2013 | Barthold | |
| 9,634,476 B1* | 4/2017 | Cao | H01H 9/542 |
| 2004/0090213 A1* | 5/2004 | Barthold | H02J 3/36 |
| | | | 323/207 |
| 2013/0128630 A1 | 5/2013 | Jensen et al. | |
| 2013/0208521 A1* | 8/2013 | Trainer | H02J 3/36 |
| | | | 363/126 |
| 2015/0002977 A1* | 1/2015 | Dupraz | H01H 9/542 |
| | | | 361/115 |
| 2016/0285250 A1* | 9/2016 | Lee | H01H 9/54 |
| 2017/0170663 A1* | 6/2017 | Christ | H02J 3/386 |

\* cited by examiner

THREE WIRE DC TRANSMISSION CIRCUIT WITH MODULATED POLE

CROSS-REFERENCE TO RELATED APPLICATION

This application claims the benefit of U.S. Provisional Patent Application Ser. No. 62/245,205, filed Oct. 22, 2015.

BACKGROUND OF THE INVENTION

1. Field of the Invention

The present invention relates to power transmission lines, and particularly to a method of converting high voltage AC lines into bipolar high voltage DC systems.

2. Description of the Related Art

There is growing interest in the development of renewable energy sources, such as wind power. Many wind power stations are located offshore and transmit power onshore through submerged high voltage DC lines. However, for historical reasons, existing onshore power transmission lines are based on three-phase high voltage AC transmission line systems. In order to take maximum advantage of the existing power transmission infrastructure while reducing costs, it would be desirable to convert existing AC power transmission lines for use as high voltage DC transmission lines.

Current approaches to high voltage DC transmission lines include a tripole HVDC system, which consists of thyristor-based or modular multilevel converter-based systems. This type is suitable only in point-to-point transmission applications. On the other hand, three-wire bipole structures (TWBS) use a power electronics-based converter fed from an isolated AC system to achieve the required performance. In this approach, the converter is connected in series with one of the wires (the modulating wire). This affects system reliability and adds more complexity.

Thus, a method of converting high voltage AC lines into bipolar high voltage DC systems solving the aforementioned problems is desired.

SUMMARY OF THE INVENTION

The method of converting high voltage AC lines into bipolar high voltage DC systems includes the use of three wires in a three-wire mode, wherein the positive pole is always considered as a go-wire, while the negative pole is always considered as a return wire. In one state, the third pole (modulating pole) is activated to be a go-wire with the positive pole via closing a switch for a certain time duration. As a result, the supply current will be divided equally between the positive pole and the modulating pole (due to similar lines resistances, assuming negligible mismatch between lines' impedances), while the entire current returns in the negative pole. In a second state, the third pole (modulating pole) is activated to be a return wire with the negative pole via closing a second switch for a certain time duration. As a result, the supply current will flow only through the positive pole, and the return path is split between the modulating pole and the negative pole. Switching is required due to thermal considerations. To avoid abrupt changes in current during transitions, additional resistors are successively inserted in series with the modulating pole and removed during transitions. The three wires may be used in two-wire mode (only the positive and negative poles) during low power levels.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
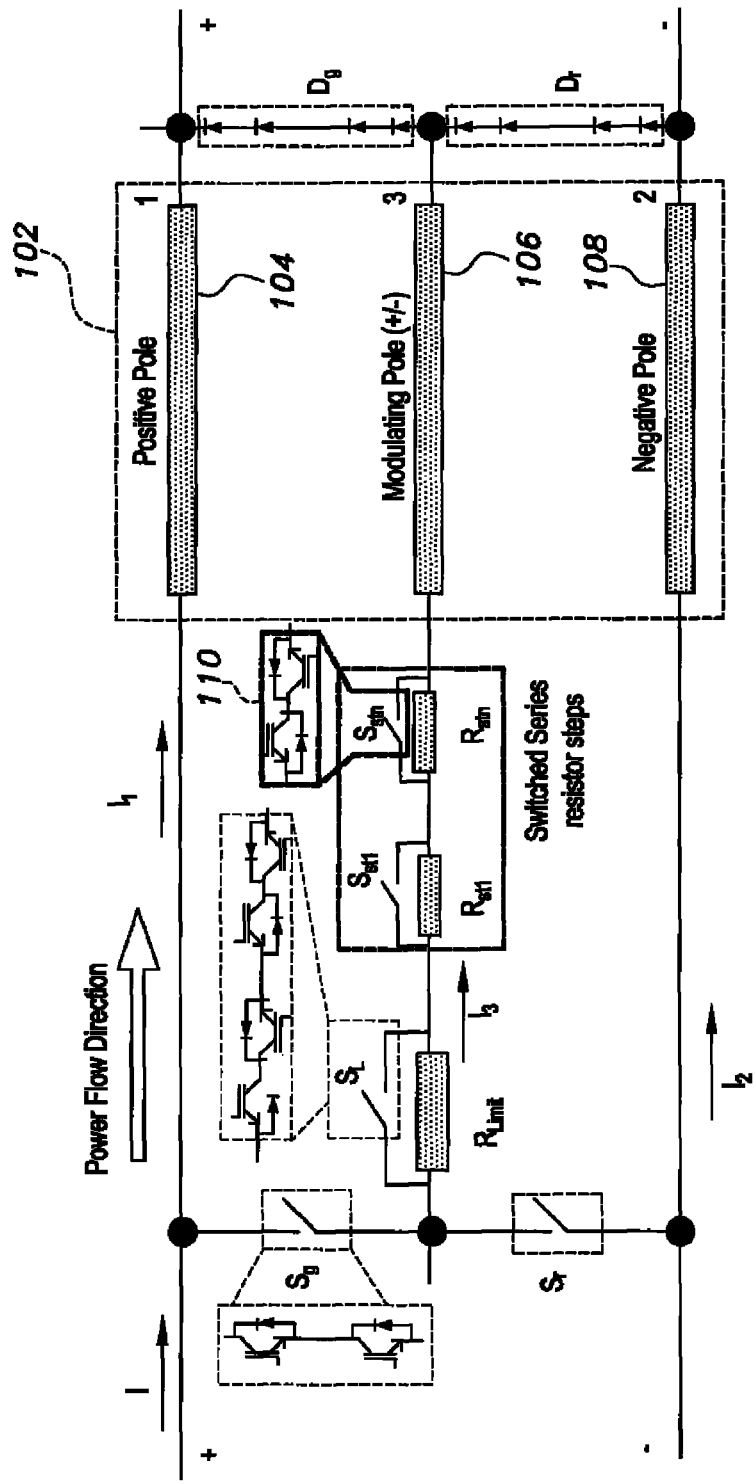
FIG. 1A is a schematic diagram of a 3-wire bipole HVDC system implementing a method of converting high voltage AC lines into bipolar high voltage DC systems according to the present invention for unidirectional current flow.

As shown in FIG. 1A, the method of converting high voltage AC lines into bipolar high voltage DC systems makes use of the three transmission lines 102 in an existing high voltage AC system as transmission lines in a bipolar high voltage DC system, e.g., for the transmission of power from a DC source (such as a wind power electric generator) to a power grid. According to the method, the three transmission lines 102 are used in a three-wire mode when the source current exceeds the rated thermal current limit of the transmission lines 102, and are used in a two-wire mode when the source current is at or below the rated thermal current limit of the transmission lines 102. For purposes of explanation, one of the transmission lines 102 is referred to as the positive pole 104, a second transmission line is referred to as the modulating pole 106, and a third transmission line is referred to as the negative pole 108.

The method involves inserting switches $S_g$ and $S_r$ in series between the positive pole and the negative pole, inserting diodes $D_g$ and $D_r$ in series between the positive pole and the negative pole parallel to switches $S_g$ and $S_r$, the modulating pole passing through midpoints between the switches $S_g$ and $S_r$ and between the diodes $D_g$ and $D_r$, inserting a current limiting resistor $R_{limit}$ in the modulating pole between the midpoint of the switches $S_g$ and $S_r$ and the midpoint of the diodes $D_g$ and $D_r$, with a bypass switch $S_L$ parallel to the current limiting resistor $R_{limit}$, and a plurality of transition resistors 110 designated $R_{st1}, R_{st2}, \ldots, R_{stn}$ in series with the limiting resistor $R_{limit}$, each of the transition resistors 110 having a corresponding parallel bypass switch $S_{st1}, S_{st2}, \ldots, S_{stn}$, as shown in FIG. 1A.

When the source current is at or below the rated thermal current limit of the transmission lines 102, the circuit is operated in two-wire mode, i.e., switches $S_g$ and $S_r$ are open, and no current flows through the modulating pole 106. All of the source current flows to the grid through the positive pole 104, and the return current flows through the negative pole 108.

When the source current is above the rated thermal current limit of the transmission lines 102, the circuit is operated in three wire-mode. In three-wire mode, the circuit alternates between a first state and a second state, depending upon the length of time the transmission lines 102 can safely carry the source current, given the rated thermal current limit. In the first state, switch $S_g$ is closed and switch $S_r$ is open. The flow of source current to the grid is divided between the positive pole 104 and the modulating pole 106, and current returning from the grid to the source is carried only by the negative pole 108. When the time period for safely carrying the source current is reached, $S_g$ is opened and switch $S_r$ is closed. Current flows from the source to the grid solely through the positive pole 104, but current returning from the grid to the source is split between the modulating pole 106 and the negative pole. In addition, in the three-wire mode, during the transitions between states additional resistance is successively inserted and removed in the modulating pole 106, as described below, in order to provide for a smooth transition in current.

Detailed construction of the switches $S_g$, $S_r$, $S_L$, and $S_{st1}$, $S_{st2}, \ldots, S_{stn}$ is shown schematically in FIG. 1A. It should be understood that in practice, the switches may be implemented as transistor switches, e.g., insulated gate bipolar transistors. The controller circuit is included in FIG. 3. The controller circuit generates the shown pulses in the case of the three-wire mode. On the other hand, in the case of the two-wire mode, it disables pulses.

The selection between operating with two-wire mode or three-wire mode is the input current level. If the injected current is lower than the thermal limit current, the two-wire mode is enabled and vice versa.

The selection of period T depends on the maximum permissible temperature of the conductors, i.e., with any selected value for the time T, the temperature rise of the conductor that is carrying current higher than limit current should not exceed the maximum permissible temperature immediately before the upcoming switching.

Figure 1B:
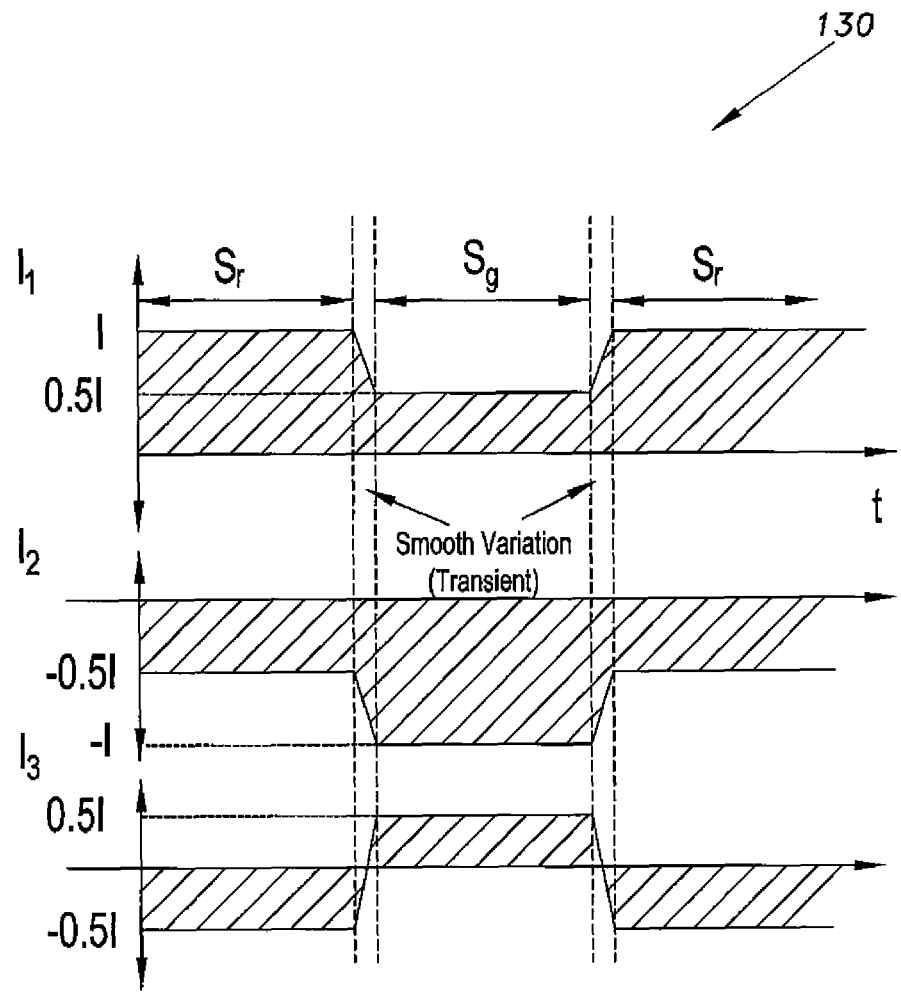
FIG. 1B is a diagram showing current distribution of the 3-wire bipole HVDC system of FIG. 1A when operating in 3-wire mode (total current greater than thermal current limit) in a method of converting high voltage AC lines into bipolar high voltage DC systems according to the present invention.
Figure 2A:
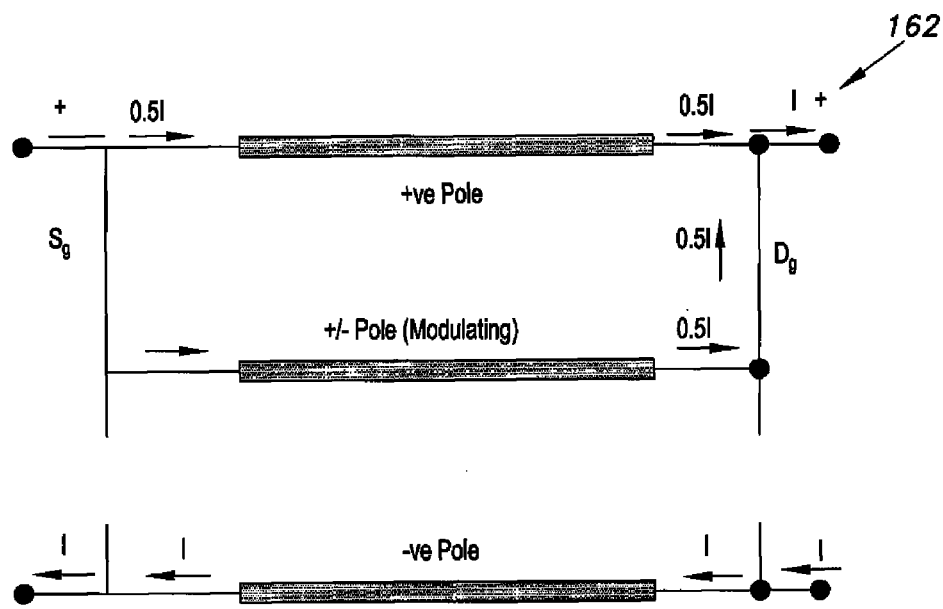
FIG. 2A is a diagram showing current distribution in the circuit of FIG. 1A with switch $S_g$ closed and switch $S_r$ open.
Figure 2B:
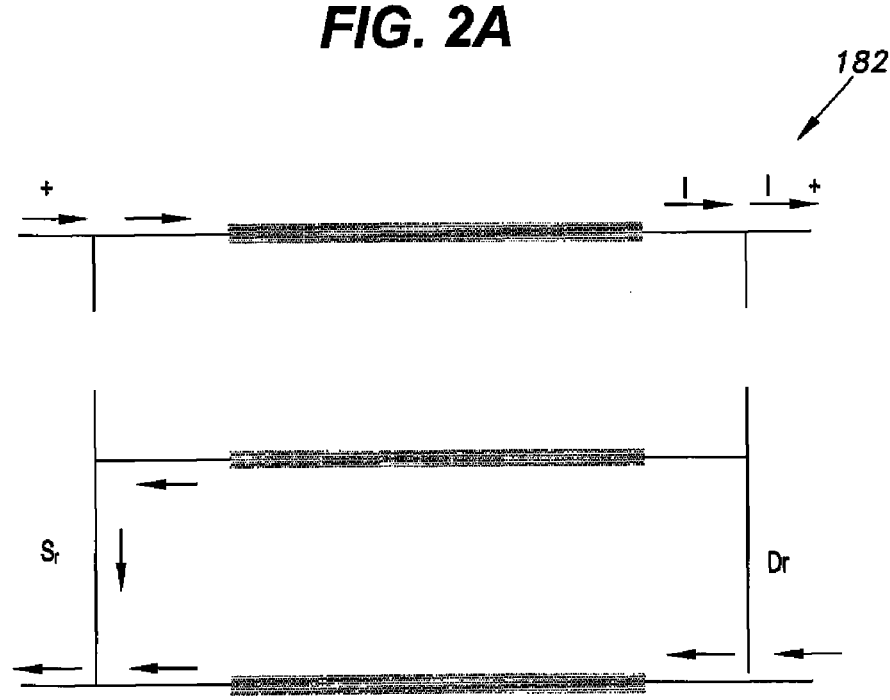
FIG. 2B is a diagram showing current distribution in the circuit of FIG. 1A with switch $S_g$ open and switch Sr closed.

Thus, the method features use of three wires 104, 106, and 108 (shown in FIG. 1A) in a three-wire mode 102a where the positive pole 104 is always considered as a go-wire, while the negative pole 108 is always considered as a return-wire. The third pole (modulating pole 106) is activated to be a go-wire with the positive pole 104 via closing a switch $S_g$ for a certain time duration. As a result, the supply current will be divided equally between the positive pole 104 and modulating pole 106 (due to similar lines resistances, assuming negligible mismatch between lines' impedances), while the entire current returns in negative pole 108. On the other hand, the modulating pole 106 can be activated to be a return-wire with the negative pole 108 via closing $S_r$ for the same time duration (as shown in plot 182 of FIG. 2B). In the latter case, the entire input current passes through positive pole 104, and returns through the negative pole 108 and modulating pole 106 (each one carries half of the positive pole current, due to equal lines resistances). The corresponding current distribution 130 among the poles during the operation is shown in FIG. 1B. Since abrupt change in current is not allowed, additional switched resistors 110 are connected in series with the modulating pole 106, as shown in FIG. 1A, which are inserted, then removed, in a successive manner during the transient period to ensure smooth variation of current to avoid high induced voltage due to the di/dt effect. The detailed design and operation of these resistors steps 110 are illustrated herein.

The limiting resistance $R_{limit}$, shown in FIG. 1A, is also used with the present system to limit the current during the transition period. It has to be noted that during low power levels, (i.e., the transmitted current is lower than the thermal limit current of the wires), two out of the three wires are only used (two-wire mode) to reduce the system losses. This can be done simply by turning off all controlled switches (via inhibiting their gate pulses). As a result, the current will be forced to pass through the positive pole 104, as a go-wire, and returns through the negative pole 108 (i.e., the modulating pole 106 is deactivated).

In the present approach and based on FIG. 1B, the root mean square (rms) current of the positive and negative poles, $I_1$ and $I_2$, are equal:

$$I_{1(rms)} = I_{2(rms)} = \sqrt{\frac{1}{2}(I^2 + 0.25I^2)} = 0.79I, \quad (1)$$

while the rms current of the modulating pole is:

$$I_{3(rms)} = 0.5I, \quad (2)$$

i.e., the rms current of the positive and the negative pole is each higher than the rms current of modulating pole in the proposed approach. If the rms currents of the positive and the negative pole are set equal to their thermal limit, as a result:

$$I_{1(rms)} = I_{2(rms)} = 0.79I = I_L, \quad (3)$$

where, $I_L$ is the thermal limit of the conductors. From equation (3), the maximum allowable input current in the three-wire mode of the present approach is:

$$\hat{I}_{3w} = \frac{1}{0.79}I_L = 1.27I_L, \quad (4)$$

while, the maximum allowable input current in the two wire bipolar HVDC system is $\hat{I}_{2w} = I_L$, so the power transferred by two-wire bipolar HVDC ($P_{2w}$) at the thermal limit of the two poles 104 and 108 is:

$$P_{2w} = 2V \times \hat{I}_{2w} = 2VI_L, \quad (5)$$

where 2V is the pole-to-pole DC voltage. The power transferred by the present three-wire bipolar HVDC ($P_{3w}$) at the thermal limit of the positive and negative poles 104 and 108 is:

$$P_{3w} = 2V \times \hat{I}_{3w} = 2V \times 1.27I_L, \quad (6)$$

Dividing equation (6) by equation (5), the ratio of the power transferred by the present three-wire bipolar HVDC to the power transferred by conventional two-wire bipolar HVDC can be calculated to be 1.27, i.e., the power transfer of the present three-wire bipolar structure can be increased by 27% over the regular bipolar structure without exceeding the thermal limit. It has to be noted that by considering the conduction and switching losses of the involved switches and the losses in the switched series steps; the amount of power enhancement will be slightly lower than 27%.

Figure 3:
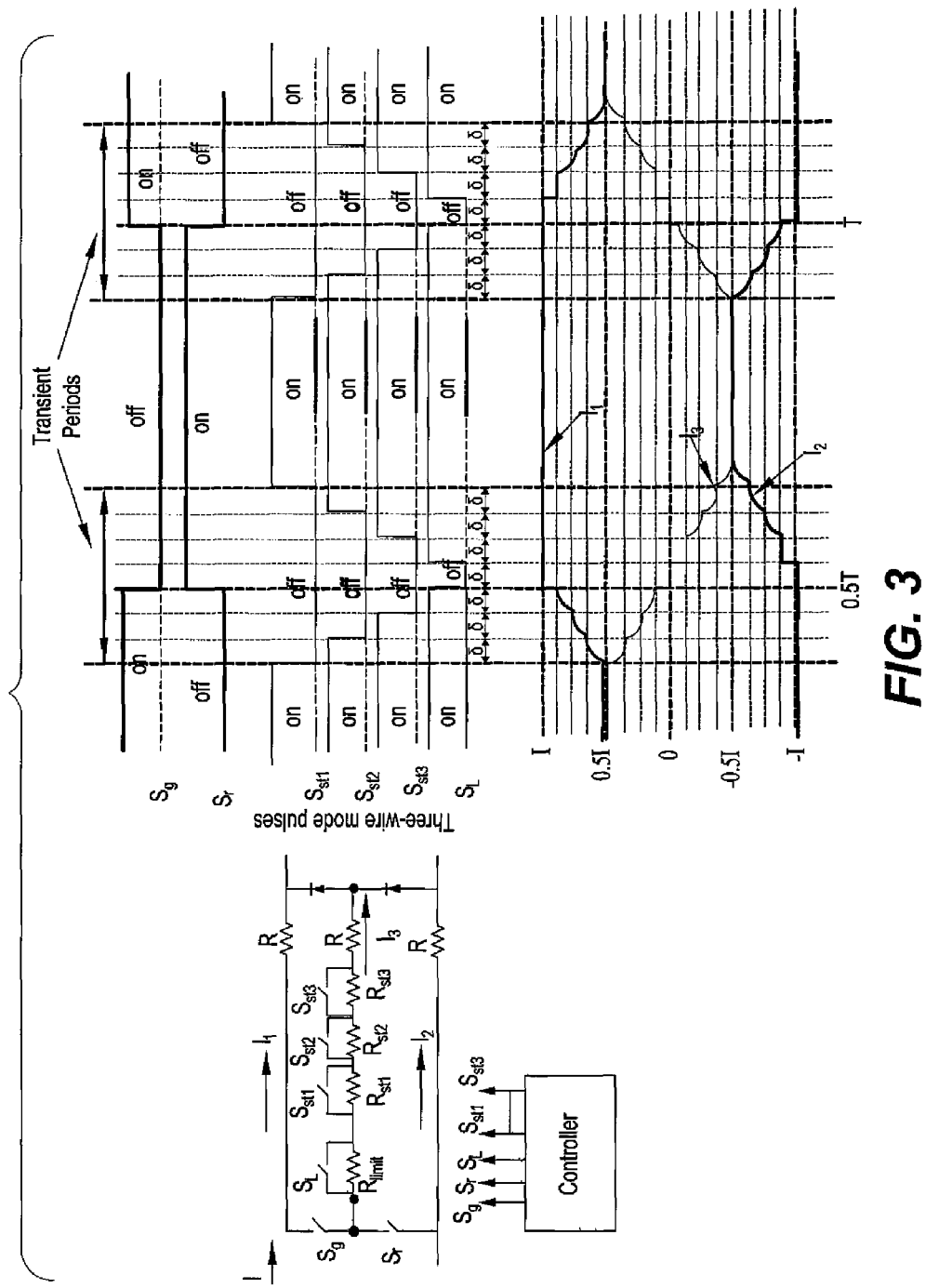
FIG. 3 is a waveform diagram and corresponding circuit distribution diagram of the circuit of FIG. 1A during transition periods.

The switched series resistor steps 110 are used to ensure a smooth variation of currents during the transition interval. The resistor steps 110 are inserted, and then removed, in a successive manner during the transition period, as shown in plots 300 of FIG. 3. In FIG. 3, just three (switched series resistor 110) steps (n=3) are considered for simplicity. The same concept can be applied to any number of resistor steps (generally, n steps). Based on FIG. 3, before the first switching instant between $S_g$ and $S_r$, the steps are inserted sequentially to decrease the current of the modulating pole 106 gradually. This can be done by opening their bypass switches $S_{st1}$, $S_{st2}$, and $S_{st3}$ sequentially, as shown in FIG. 3.

While the switched series resistor steps are sequentially inserted, the current of modulating pole 106 decreases, and the current of the positive pole 104 increases, as both poles are connected in parallel, while constant input current is assumed (current divider rule). At the first switching instant (t=0.5T), the switch $S_r$ is turned on, while the switch $S_g$ is turned off. The limiting resistor $R_{limit}$ is also inserted simultaneously to limit the discharging current due to the effect of line capacitances. Then, it is removed after a suitable time delay. During this time delay, the current of the modulating pole 106 is decayed to almost zero, and becomes ready for reversing it in the other direction. It has to be noted that, after the switching, the voltage of the modulation pole 106 with respect to ground is changed from +V to -V. The rate of voltage change mainly depends on the line parameters, the value and the insertion time of the limiting resistor.

After removing the limiting resistor by closing its bypass switch ($S_L$), the switched series resistor steps are removed sequentially to increase the current of the modulating pole 106 gradually. This can be done by closing their bypass switches $S_{st3}$, $S_{st2}$, and $S_{st1}$ sequentially, as shown in FIG. 3. It has to be noted that these bypass switches are bidirectional semiconductor or fast-mechanical switches, rated at a low voltage rating of a few kV.

By removing the switched series resistor steps, the current of the modulating pole 106 increases in the opposite direction, while the current of the negative pole 108 decreases, as both poles are connected in parallel and have constant input current. The same procedure is repeated with each switching instance (multiples of 0.5T).

The values of switched series resistor steps 110 are selected to ensure smooth variation of currents as follows (assuming three steps only for simplicity). After inserting the first step, it is required to decrease the current of the modulating pole by 25% of its initial value at steady-state, generally 1/(n+1), (i.e., reduced to 0.75×0.5I). To find the suitable value of the step 1 resistor $R_{st1}$, the current divider rule after insertion of the step 1 resistor is applied as in equation (7):

$$\text{modulating pole current} = 0.75(0.5I) = \frac{R}{2R + R_{st1}}I. \quad (7)$$

By solving equation (7), the value of the step 1 resistor is:

$$R_{st1} = \frac{2}{3}R, \quad (8)$$

where R is the pole resistance. Similarly, after inserting the second step, the desired steady state value of the modulating pole current will be 0.5×0.5I. By applying the current divider rule after inserting step 2, the following equation can be obtained:

$$0.5(0.5I) = \frac{R}{2R + R_{st1} + R_{st2}} I. \quad (9)$$

Solving equation (9), the value of step 2 resistor $R_{st2}$ is given as:

$$R_{st2} = \frac{4}{3} R. \quad (10)$$

Finally, after inserting the third step, the desired value of the modulating pole current will be 0.25×0.5I. To find the suitable value of the step 3 resistor $R_{st3}$, the current divider rule is used, as in equation (11):

$$0.25(0.5I) = \frac{R}{2R + R_{st1} + R_{st2} + R_{st3}} I. \quad (11)$$

Solving equation (11), the value of the step 3 resistor is:

$$R_{st3} = 4R. \quad (12)$$

Generally for n steps, the resistance of step #m can be obtained using the current divider rule as follows:

$$(n - m + 1) \frac{1}{(n+1)} (0.5I) = \frac{R}{2R + R_{st1} + \ldots + R_{stm}} I,$$

and in closed form:

$$R_{stm} = \frac{2R(n+1)}{(n-m+1)} - (2R + R_{st1} + \ldots + R_{stm-1}). \quad (13)$$

The average power losses in the (n steps) switched resistor can be expressed approximately as follows (assuming negligible line inductance and negligible current in the modulating pole during insertion of limiting resistance):

$$P_{st} \cong \frac{\delta}{0.5T} \times (0.5I)^2 \times 2 \left[ \sum_{k=1}^{n} \left[ \left( \frac{n-k+1}{(n+1)} \right)^2 \sum_{j=1}^{k} R_{stj} \right] \right], \quad (14)$$

where $\delta$ is the time delay for switched resistor steps (plots 300 of FIG. 3). The actual power losses in the steps will be lower than the value shown in equation (14), as the actual currents change exponentially due to the effect of line inductance. Since the transition period has a duration in range of a few seconds, while the duration of the switching cycle is in the range of a few minutes (i.e., T>>$\delta$), the average power losses in the switched resistors are insignificant compared to the modulating line losses ($(0.5I)^2 \times R$). For example, for n=3, $\delta$=0.1 s and T=4 minutes, the average power losses in the resistor steps is 0.35% of the modulating line losses.

It is assumed that it may be possible to change the resistance of the modulating pole 106 by replacing it. Hence, the effect of resistance change on power transmission capability is investigated.

Assume that the positive pole 104 and the negative pole 108 have an equal resistance R, while the modulating pole 106 has a resistance $R_m$, where $R_m$ is lower than R, (i.e., $R_m=R/k$ and k>1). When the modulating pole 106 is paralleled to the negative pole 108 (as a return wire), the currents of the positive, negative, and modulating poles will be I, $-I/(1+k)$, and $-kI/(1+k)$, respectively, where I is the input current, as shown in FIG. 1A and detailed in plot 130 of FIG. 1B.

On the other hand, when the modulating pole 106 is paralleled to the positive pole 104 (as a go-wire), the currents of the positive, negative, and modulating poles will be $I/(1+k)$, $-I$, and $kI/(1+k)$, respectively. The root mean square (rms) current of the positive and negative poles, $I_1$ and $I_2$, are equal:

$$I_{1(rms)} = I_{2(rms)} = I \sqrt{\frac{1}{2} \left(1 + \frac{1}{(1+k)^2}\right)}, \quad (15)$$

while the rms current of the modulating pole 106 is given by:

$$I_{3(rms)} = \frac{k}{k+1} I, \quad (16)$$

For a successful and safe operation, both quantities given by equations (15) and (16) should be lower than the conductor thermal current limit, as shown below:

$$I \sqrt{\frac{1}{2} \left(1 + \frac{1}{(1+k)^2}\right)} < I_L, \text{ and } \frac{k}{k+1} I < I_L. \quad (17)$$

Based on equation (17), the maximum allowable input current in the three-wire mode of the present method is given by:

$$\hat{I}_{3w} = \min\left( \frac{k+1}{k}, \frac{k+1}{\sqrt{\frac{1}{2}((1+k)^2 + 1)}} \right) I_L. \quad (18)$$

The proposed power enhancement will be:

$$\% \Delta P = \frac{P_{3w} - P_{2w}}{P_{2w}} 100\%, . \quad (19)$$

where $P_{2w}$ is the power transferred by the two-wire bipolar HVDC at the thermal limit of the two poles, which equals $2VI_L$, while $P_{3w}$ is the power transferred by the proposed three-wire bipolar HVDC, which equals $2V\hat{I}_{3w}$, by substituting with power values in equation (19) yields:

$$\% \Delta P = \left( \min\left( \frac{k+1}{k}, \frac{k+1}{\sqrt{\frac{1}{2}((1+k)^2 + 1)}} \right) - 1 \right) 100\%. \quad (20)$$

To find k at which maximum power enhancement can be achieved, the rms currents of all poles should be equal to the thermal current limit. By equating the rms currents, the optimum value of k, ($k_{opt}$), can be obtained, as in equation (21), which corresponds to an optimum power enhancement of approximately 37%, i.e., the same as a conventional tripole HVDC configuration:

$$k_{opt} = 2.732. \quad (21)$$

To have $k=k_{opt}$, the existing modulating wire of resistance $R_m$ should be replaced with another one with a resistance of $R_m/2.732$. Alternatively, another wire with a resistance of $R_m/1.732$ can be connected in parallel with the existing modulating pole to achieve optimum transmission capability. Generally, the transmission losses in this case can be expressed by:

$$P_{loss} = RI_{1(rms)}^2 + RI_{2(rms)}^2 + R_m I_{3(rms)}^2 \quad (22)$$
$$= RI_{1(rms)}^2 + RI_{2(rms)}^2 + (R/k)I_{3(rms)}^2.$$

Substituting from equations (15) and (16) into equation (22) yields:

$$P_{loss} = R\left(1 + \frac{1}{k+1}\right)I^2. \quad (23)$$

The equivalent resistance of the transmission line seen by the input terminal, namely, $R_{eq}$, equals $P_{loss}/I^2$. Thus, it will be:

$$R_{eq} = R\left(1 + \frac{1}{k+1}\right). \quad (24)$$

Figure 4A:
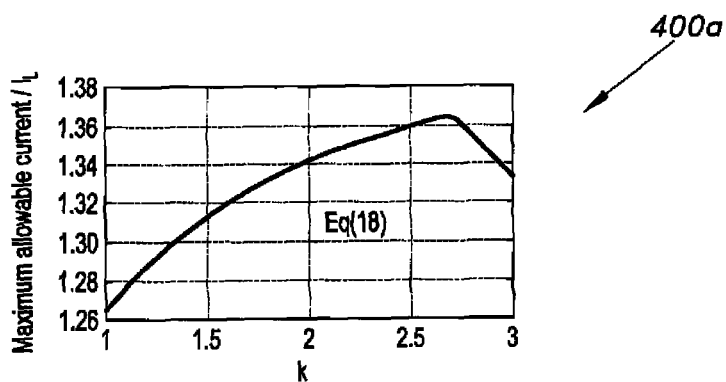
FIG. 4A is a graph showing maximum allowable input current in the circuit of FIG. 1A.
Figure 4B:
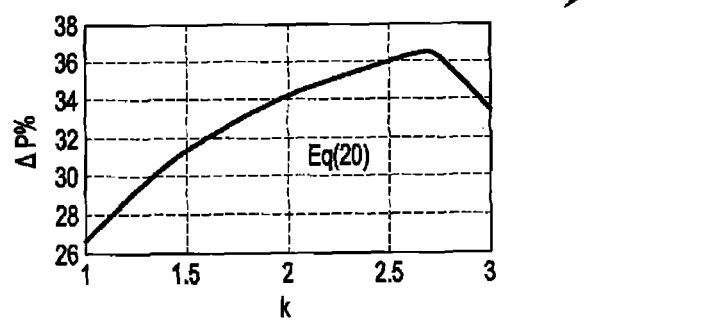
FIG. 4B is a graph showing variation of the power enhancement in the circuit of FIG. 1A.
Figure 4C:
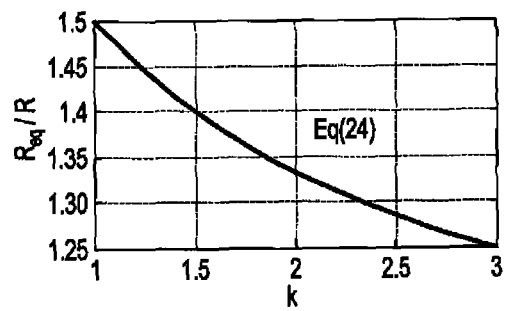
FIG. 4C is a graph showing variation of the equivalent line resistance in the circuit of FIG. 1A.

Plots 400a, 400b, and 400c of FIGS. 4A, 4B, and 4C, respectively, show the variation of maximum allowable input current/$I_L$, the corresponding percentage of the proposed power enhancement (% ΔP), and the equivalent line resistance/R with the variation of k (where $k=R/R_m$).

Figure 5:
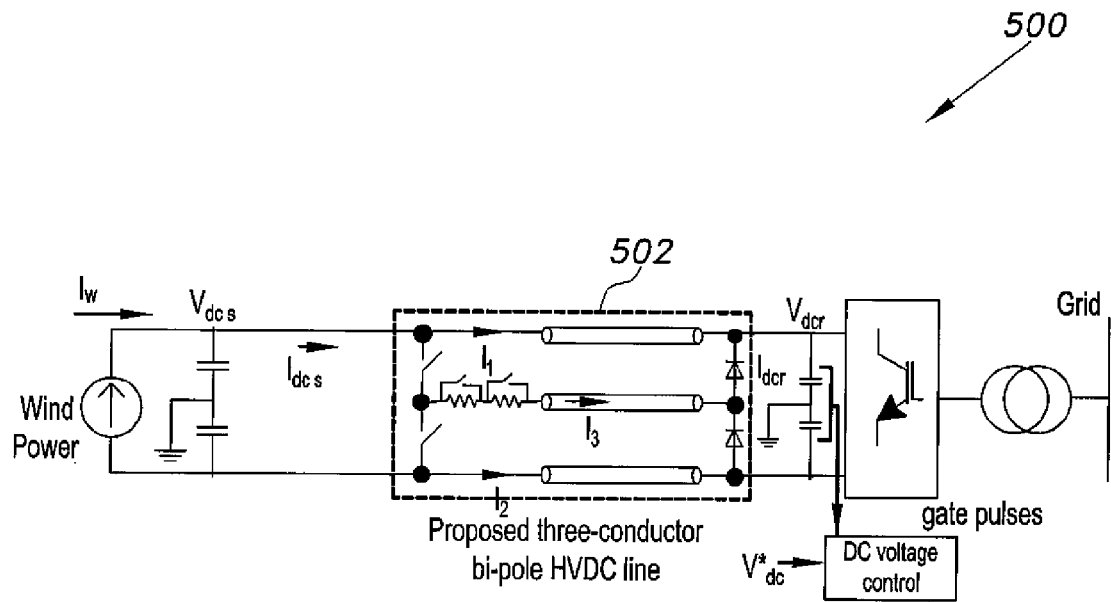
FIG. 5 is a schematic diagram showing the transmission line circuit of FIG. 1A interfacing a wind power generator with a grid.

The present configuration to convert high voltage AC lines into bipolar high voltage DC systems, shown in FIG. 1A, has been built using a Matlab/Simulink platform with the parameters shown in Table 1. The circuit diagram for the simulated system 500 is shown in FIG. 5, where the system is configured to receive DC voltage from a wind turbine, the current flowing through the existing three-wire AC transmission lines modified to a bipolar high voltage DC system in block 502. In the simulated system 500, the three-wire output is connected to a power grid as load.

TABLE 1

| Simulation Parameters | |
|---|---|
| Parameter | Value |
| Reference DC voltage $V_{dc}$ | 300 kV (±150 kV) |
| DC link capacitors | 500 μF |
| Conductors' thermal limit current, $I_L$ | 800A |
| Maximum input current | 1.274$I_L$ ≈ 1000A |
| Injected current ($I_W$) | 1000A (three-wire mode) |
| | 800A (two-wire mode) |
| Transmission line parameters | Length: 100 km |
| | Resistance: 0.012 Ω/km |
| | Inductance: 1 mH/km |
| | Capacitance: 12.74 nF/km |

TABLE 1-continued

| Simulation Parameters | |
|---|---|
| Parameter | Value |
| Switched series resistor steps Three steps (n = 3) | Step 1= (2/3)(0.012)(100) Ω |
| | Step 2= (4/3)(0.012)(100) Ω |
| | Step 3= 4(0.012)(100) Ω |
| Smooth variation delay | δ = 0.2 s |
| Limiting resistor | 20 kΩ |
| Operational cycle | T = 20 s |
| Voltage/current ratings of switches | $S_g$, $S_r$, $D_g$, $D_r$, $S_L$    300 kV |
| | 0.5 kA |
| | $S_{st1}$, $S_{st2}$, and $S_{st3}$    1 kV |
| | 0.5 kA |

In the simulations, two operational modes are considered. First, one considers three-wire operation when the injected current from the wind side converter ($I_w$) is higher than the conductor thermal current limit. The simulation results for this case are shown in FIGS. 6A, 6B, 7A, 7B, 8A, 8B, 9A, 9B, 10, 11, 12 and 13.

Figure 6A:
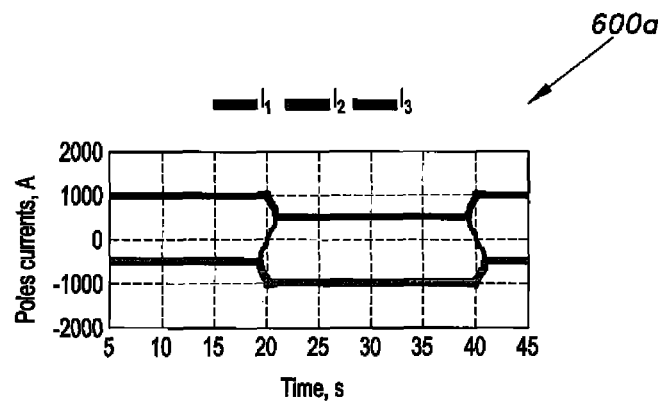
FIG. 6A is a plot of computer simulation of poles current vs. time of the circuit of FIG. 1A when operated in 3-wire mode.

Plot 600a of FIG. 6A shows the current distribution among different poles when the switching procedure illustrated in plot 300 of FIG. 3 is applied.

Figure 6B:
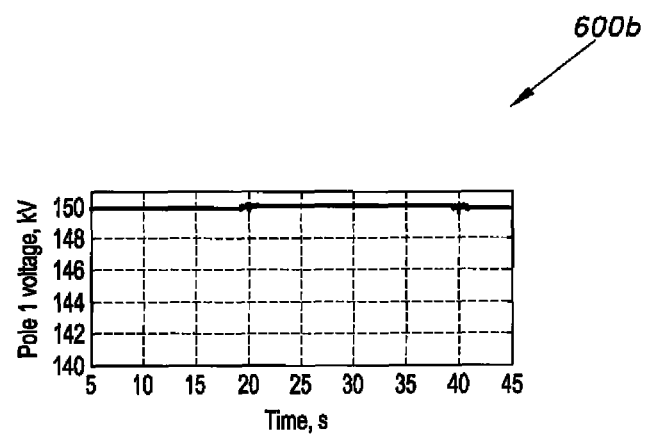
FIG. 6B is a plot of computer simulation of positive pole voltage vs. time of the circuit of FIG. 1A when operated in 3-wire mode.
Figure 7A:
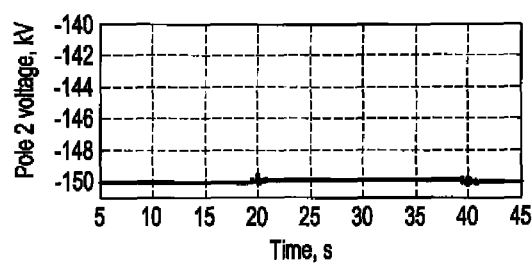
FIG. 7A is a plot of computer simulation of negative pole voltage vs. time of the circuit of FIG. 1A when operated in 3-wire mode.
Figure 7B:
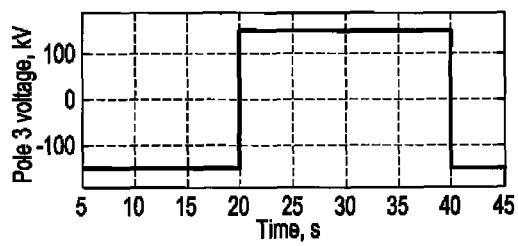
FIG. 7B is a plot of computer simulation of modulating pole voltage vs. time of the circuit of FIG. 1A when operated in 3-wire mode.
Figure 8A:
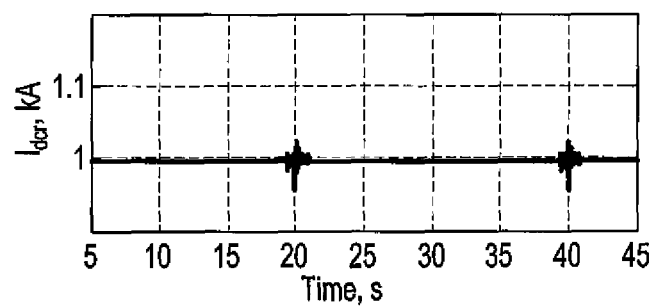
FIG. 8A is a plot of computer simulation of current at the receiving end ($I_{dcr}$) vs. time of the circuit of FIG. 1A when operated in 3-wire mode.

The currents are changed smoothly, which significantly reduces di/dt stresses. Plots 600b, 700a, and 700b of FIGS. 6B, 7A, and 7B show the voltage of the positive, negative, and modulating poles, respectively. The voltage of the positive/negative poles are fixed at +/−150 kV during the operation, while the voltage of modulating pole 106 is changed from +150 kV to −150 kV with the switching as shown in plot 700b of FIG. 7B. The rate of voltage change depends on the line parameters, the value, and the insertion time of the limiting resistors. Plot 800a of FIG. 8A shows the DC current at the receiving end ($I_{der}$).

Figure 8B:
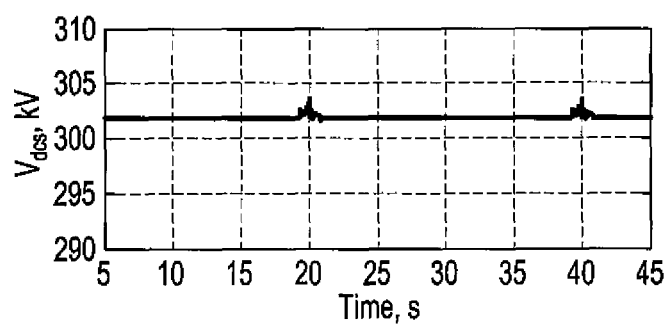
FIG. 8B is a plot of computer simulation of current at the sending end ($I_{dcs}$) vs. time of the circuit of FIG. 1A when operated in 3-wire mode.

The current equals the sending end current during steady-state conditions. As a result of the switching actions, the received current is oscillating around its steady-state value during transition periods to maintain constant receiving end DC voltage at 300 kV. On the other hand, plot 800b of FIG. 8B shows that the sending end DC voltage ($V_{des}$) slightly increases during the transition period as a result of the switching actions. Generally, an overvoltage protection circuit (chopper circuit) is connected across the DC-link of the wind energy system to avoid overvoltage problems during grid AC side faults. In the present structure, if the voltage increase of the sending end point (during transition intervals) is higher than the threshold voltage of the overvoltage protection circuit, the circuit will be activated to limit the voltage via dissipating the surplus power in the chopper resistor. In the present results, the overvoltage protection circuit is not used. The corresponding sending end and receiving end powers are shown in plot 900a of FIG. 9A. The receiving end power is fixed during steady-state conditions and is lower than the sending end power due to line losses. The received end power is oscillating around its steady-state value during transient periods, as a reflection for receiving current oscillations.

Figure 9A:
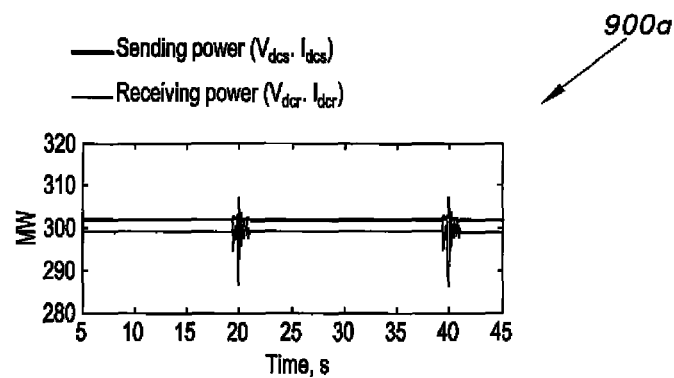
FIG. 9A is a plot of computer simulation of sending and receiving power vs. time of the circuit of FIG. 1A when operated in 3-wire mode.
Figure 9B:
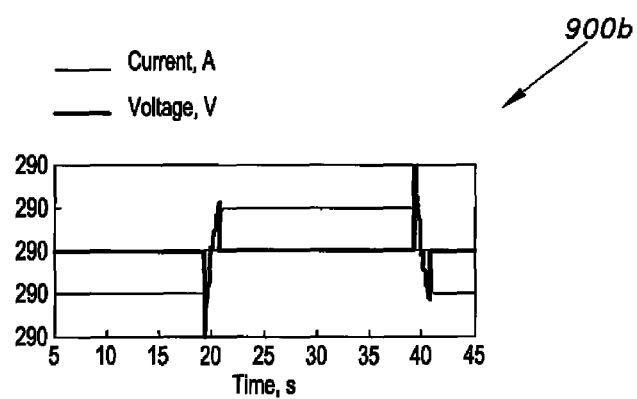
FIG. 9B is a plot of computer simulation of switching voltage and current vs. time of a switch inserting and removing resistance in series with the modulating pole in the circuit of FIG. 1A when operated in 3-wire mode.
Figure 10:
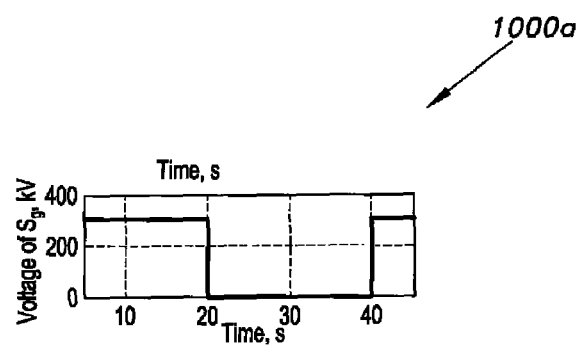
FIG. 10 is a plot of computer simulation of the voltage across switch $S_g$ vs. time of the circuit of FIG. 1A when operated in 3-wire mode.
Figure 11:
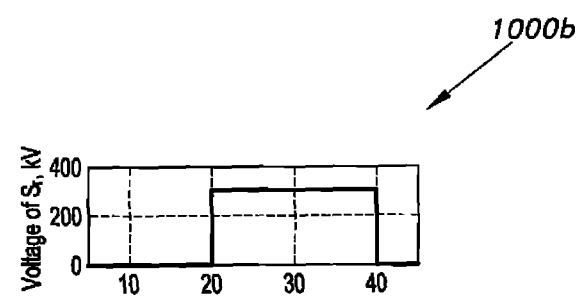
FIG. 11 is a plot of computer simulation of the voltage across switch $S_r$ vs. time of the circuit of FIG. 1A when operated in 3-wire mode.
Figure 12:
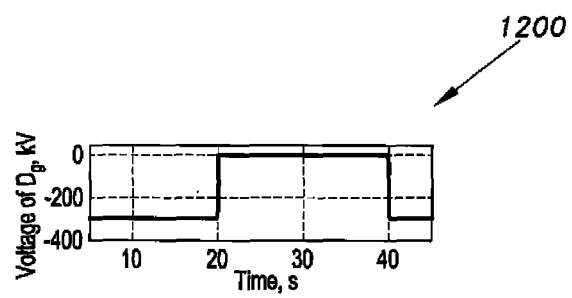
FIG. 12 is a plot of computer simulation of the voltage across diode $D_g$ vs. time of the circuit of FIG. 1A when operated in 3-wire mode.
Figure 13:
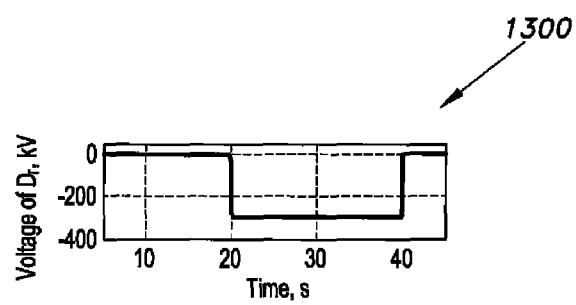
FIG. 13 is a plot of computer simulation the voltage across diode $D_r$ vs. time of the circuit of FIG. 1A when operated in 3-wire mode.

The voltage and current of step 1 bypass switch $S_{st1}$ is shown in plot 900b of FIG. 9B. It is clear that the voltage rating of the bypass switches is relatively low (1 KV in this simulated case), i.e., switches with low on-state voltage will be used, which reflects positively on the amount of conduction losses during bypassing action. On the other hand, the current rating of these switches will be based on the modulating pole current level (500 A in this simulated case). Finally, the voltage across the go and return switches $S_g$ and $S_r$ during an operational cycle is shown in plots 1000a, 1000b, 1200, and 1300 of FIGS. 10, 11, 12, and 13, respectively. There are no electrical stresses on the go and return switches $S_g$ and $S_r$ during transition intervals.

Figure 14:
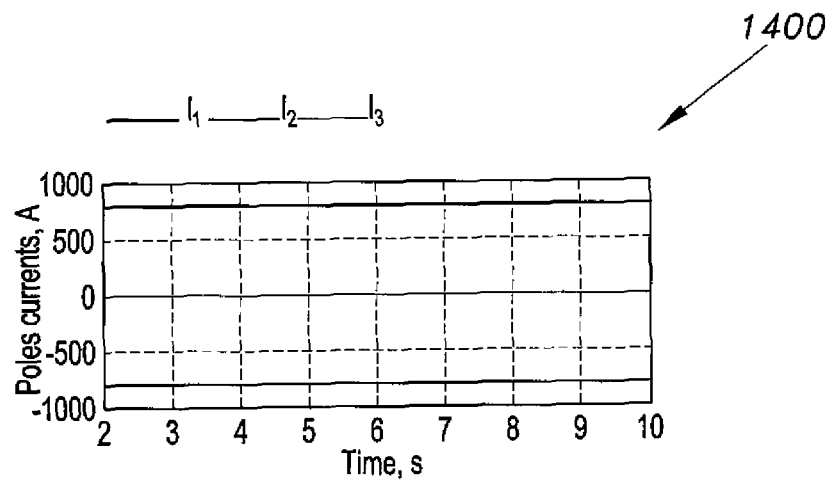
FIG. 14 is a plot of computer simulation of poles current vs. time of the circuit of FIG. 1A when operated in 2-wire mode.
Figure 15:
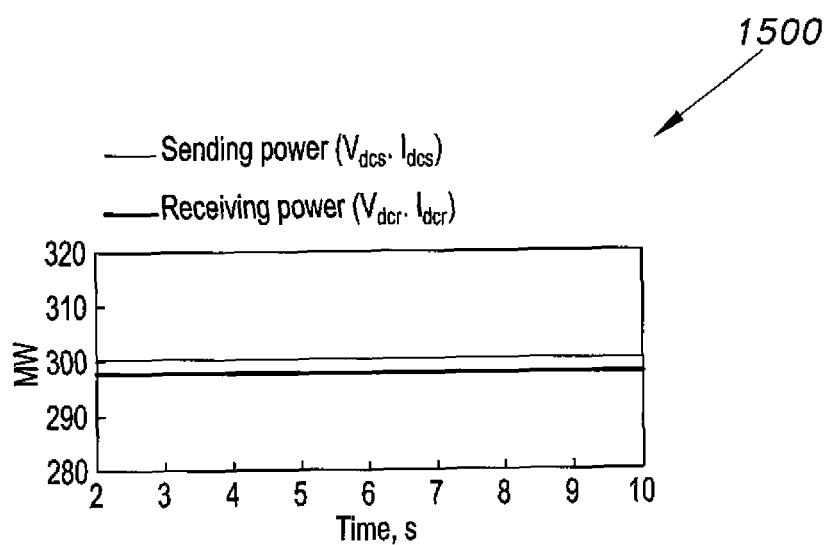
FIG. 15 is a plot of computer simulation of sending and receiving power vs. time of the circuit of FIG. 1A when operated in 2-wire mode.

In the second operational mode, two out of three wires are used only to reduce the system losses emanating from the switch conduction losses, as the injected current ($I_w$) equals the thermal current limit (i.e., in this mode, the present structure is working similar to the conventional two-wire bipole HDVC system). This can be done simply in the present configuration by opening the go and return switches ($S_g$ and $S_r$). The corresponding simulation results for this case is shown in plot 1400 of FIG. 14, where the positive pole 104 carries the full current and the whole current returns through the negative pole 108. The modulating pole 106 is deactivated and carries zero current. The corresponding sending end and receiving end powers are shown in plot 1500 of FIG. 15.

A use of the method includes droop control in multi-terminal HVDC (MTDC) for interconnecting dispersed offshore wind farms to the grid. Since the existing transmission system infrastructure is still based on AC systems, converting existing AC lines to an extended multi-terminal three-wire bipolar HVDC system can be then a cost effective solution to extend the HVDC to onshore, especially in long transmission systems with bulk power transfer. To automatically coordinate between different converters in a MTDC system, droop control techniques are adopted as an effective means to regulate the system DC voltage level without the need for fast communications between units. The droop control design is mainly dependent on the line resistances. It is shown herein that the equivalent resistance of a three-wire bipolar system changes based on the operational mode. The two-wire mode is activated during low current magnitudes (lower than conductor thermal current limit), while the three-wire mode is activated in case of high current magnitudes (higher than the conductor thermal current limit). The modification to droop control design of a MTDC equipped with a three-wire bipolar system is presented to tackle this resistance variation with the operating conditions.

Figure 16A:
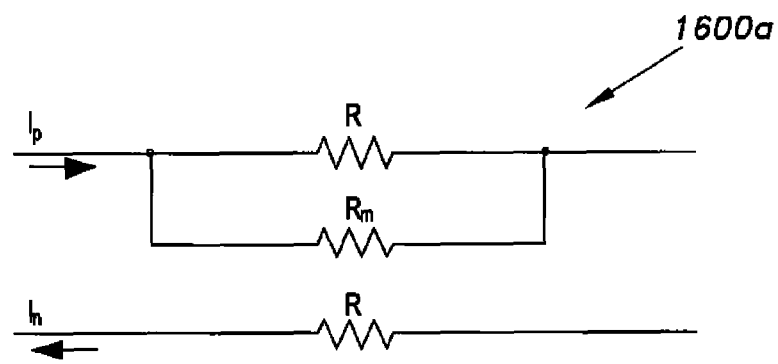
FIG. 16A is a circuit diagram representing steady state equivalent resistance of the three-wire bipolar transmission line of FIG. 1A when switch $S_g$ is on (closed) and switch $S_r$ is off (open).
Figure 16B:
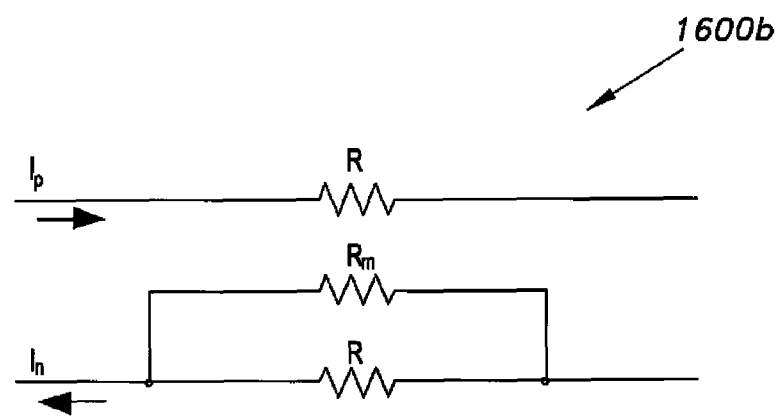
FIG. 16B is a circuit diagram representing steady state equivalent of the three-wire bipolar transmission line of FIG. 1A when switch $S_g$ is off (open) and switch $S_r$ is on (closed).

The value of equivalent resistance in the exemplary three-wire bipolar HVDC system shown in FIG. 1A is calculated for the two possible operational modes (two-wire and three-wire modes). In case of the three-wire mode, circuit 1600a of FIG. 16A and circuit 1600b of FIG. 16B show the DC equivalent circuits, where each line is represented by an equivalent resistance, R. The resistance of the modulating wire $R_m$ is set to an assumed value, in general, different from the other two poles. Circuits 1600a and 1600b show the equivalent resistance when $S_g$ and $S_r$ are turned on, respectively. It is clear that the same equivalent circuit, and hence, total resistance as seen from the source will be the same.

Under two-wire mode, the modulating wire is disconnected by deactivating both $S_g$ and $S_r$. To use same equivalent circuit under both modes, the resistance of the modulating pole $R_m$ can be set to $\infty$ to emulate an open line. At any instant, the modulating pole may be connected in parallel either to the positive or the negative poles, as shown in FIGS. 16A and 16B. Hence, same total resistance is obtained in both cases as:

$$R_{eq} = \frac{RR_m}{R+R_m} + R, \tag{25}$$

assuming $R_m = R/k$. Hence:

$$R_{eq} = \frac{R}{k+1} + R = \frac{k+2}{k+1}R. \tag{26}$$

If the modulating pole resistance equal the resistance of other lines, i.e., k=1, then the equivalent resistance for a three-wire mode is $R_{eq}=1.5R$. In the two-wire mode, only two out of three conductors are used due to a lower transmitted current (lower than the thermal limit current). The corresponding equivalent resistance in this case will be $R_{line}=2R$, by substituting k=0, which models infinite line resistance (open line case). Thus, by switching the operation from two-wire mode to three-wire mode, the resistance changes from 2R to [(k+2)/(k+1)] R. The effect of the resistance change on the selection of the droop gain is presented below.

With respect to the present droop control design, in an MTDC system 1700 (shown in FIG. 17), the control of the voltage source converter (VSC) is typically based on appropriate voltage-current characteristics suitable for the operating mode. Different control methods are covered in the literature, such as the voltage margin method, the master-slave method, and DC voltage-current droop control. Among these control techniques, DC voltage-current droop control is preferable, as it enables power flow control without a need for fast communication between converters, which is a significant advantage over other control methods.

DC voltage droop control may be used for balancing power in a DC grid, considering DC line drops. Offshore wind generators may be used to provide inertia and primary frequency control to the onshore grid by means of communication-free control methodology. This methodology is based on DC voltage control using power and frequency droops at the onshore converter and frequency regulation at the offshore converter. In a typical droop control scheme for MTDC, the droop gains may be selected based on frequency-response performance characteristics, such as the desired voltage errors, and the maximum control inputs may be considered in the control scheme. However, transmission efficiency, which is a significant operational factor in transmission systems, was not considered in the design of the aforementioned droop gains. Although the typical control method may be based on optimal power flow in MTDC in order to minimize line losses, the need for an effective communication system may limit its application. It is also known that the droop gain design is mainly dependent on the line resistances. A methodology to design the required droop controller to ensure maximum power transmission in the HVDC system while avoiding communication between different converters was presented in the prior art. It has been shown that if the power is shared between offshore feeders in an inversely proportional fashion to their resistances, the required voltages at the grid side converters will be the same. This condition yields a minimum system copper loss. As shown before, depending on the employed mode of operation of a three-wire bipole HVDC line, the equivalent resistance will vary. Hence to ensure certain power sharing ratio between different lines, the droop gain design should be selected according to the current equivalent resistance.

Figure 17:
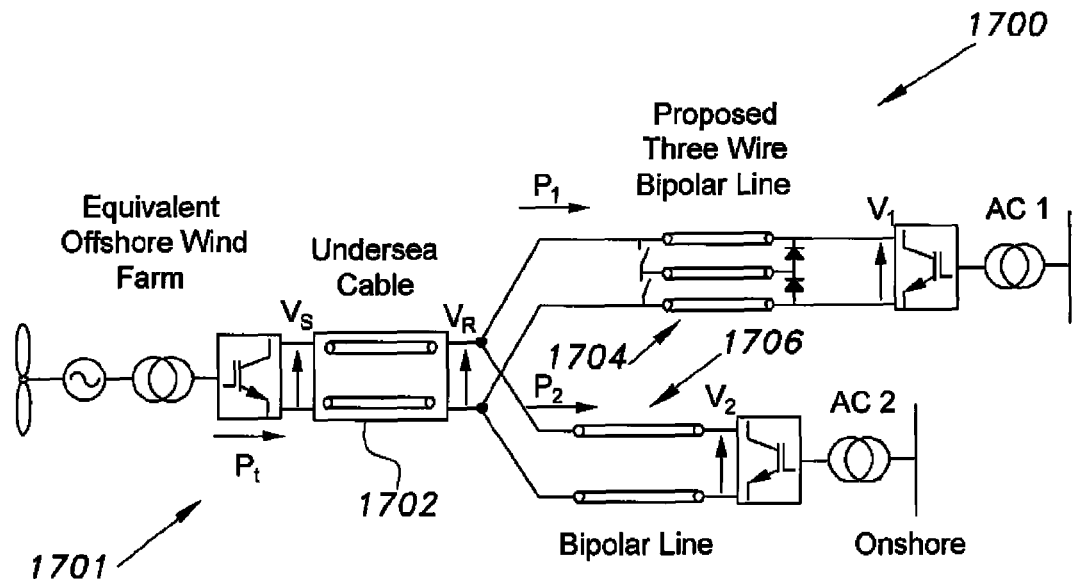
FIG. 17 is a schematic diagram showing an offshore wind farm system used to illustrate integration of a three-terminal HVDC line in a method of converting high voltage AC lines into bipolar high voltage DC systems according to the present invention.

For sake of simplicity, a three-terminal HVDC system 1700 shown in FIG. 17 is considered to explore the present droop control concept. In this system, the power generated from an equivalent offshore wind turbine is transmitted from offshore transmission system 1701 to the onshore side via an undersea cable 1702. The total power is then divided among lines 1 and 2 that transmit power to the grid through two VSCs ($V_1$ and $V_2$). As modeled in circuit 1800 of FIG. 18, Line 1 is assumed to be a three-wire bipolar line, while line 2 is a conventional bipolar HVDC line. In the present droop gain control design methodology, the effect of resistance change on the droop gain selection to ensure certain power sharing between the two lines is considered. This proposal focuses only on the modification required for the droop gain of the converter connected to the three-wire bipolar line. The effect of system constraints on the droop gain selection of the two-wire bipolar line is known in the art.

Figure 18:
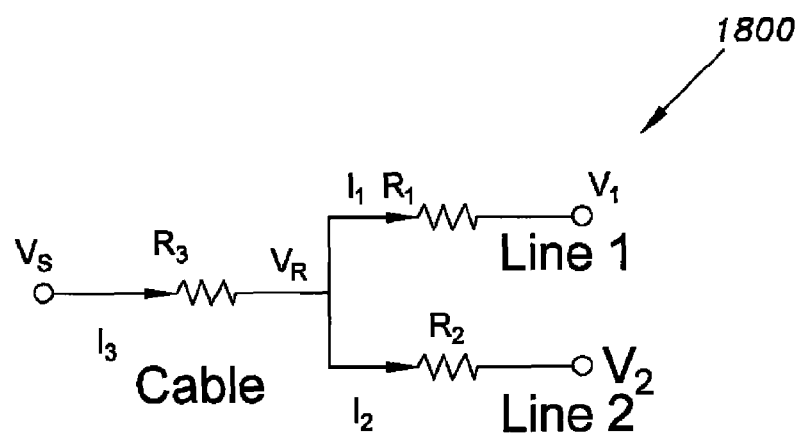
FIG. 18 is a schematic diagram of an equivalent circuit for the system of FIG. 17.

The system 1700 can be simply represented using the equivalent DC circuit 1800 shown in FIG. 18, bearing in mind that the power is unidirectional in this system (i.e., the power flow direction is from the wind farms to the grid). Each line or cable is represented by a series resistance. The relation between the sending and receiving end voltages is given by:

$$V_S = V_R + R_3 I_3, \tag{27}$$

where, $V_S$ is the voltage at the sending end (S) and $V_R$ is the voltage of the receiving end (R) of the undersea cable. The grid side converter voltages are given by (28) and (29), as follows:

$$V_1 = V_R - R_1 I_1, \tag{28}$$

and $$V_2 = V_R - R_2 I_2. \tag{29}$$

Figure 19:
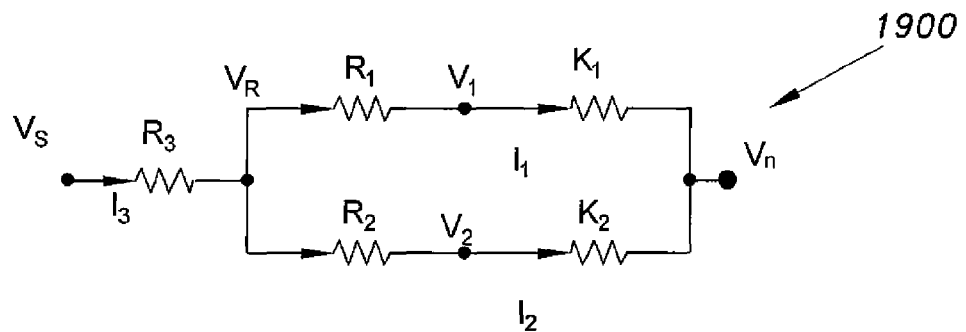
FIG. 19 is a schematic diagram representing the simplified DC equivalent circuit of FIG. 18, showing the equivalent resistance for each line.

The relations between the voltages and currents of the two grid side converters follow the droop characteristics and are given by (30) and (31), as follows:

$$V_1 = V_n + K_1 I_1, \tag{30}$$

and $$V_2 = V_n + K_2 I_2, \tag{31}$$

where, $V_n$ is the system no-load voltage. The droop voltage terms in (30) and (31) can be represented by resistances and equivalent DC circuit 1800 can then be used as circuit 1900, shown in FIG. 19. The currents $I_1$ and $I_2$ can then be calculated from (32) and (33) as:

$$I_1 = \frac{V_R - V_n}{R_1 + K_1}, \tag{32}$$

and $$I_2 = \frac{V_R - V_n}{R_2 + K_2}. \tag{33}$$

The power at any converter k is given by (34) as:

$$P_k = V_k I_k, \tag{34}$$

Solving (25) through (34), the system power flow for a given wind farm injecting power $P_t$ can be calculated. It is important to mention that the power sharing ratio between lines 1 and 2 will mainly depend on their resistances and the drooping constants for converters 1 and 2.

As discussed earlier, for the three-wire bipolar system, the equivalent DC line resistance depends on the corresponding DC current. Hence, to ensure a certain current ratio between the two lines, the droop gain should be adjusted in accordance with the current value of the equivalent line DC resistance. For a certain power sharing ratio $\alpha$, the current sharing ratio between $I_1$ and $I_2$ should follow the same ratio as:

$$\frac{P_1}{P_2} = \frac{I_1}{I_2} = \frac{R_2 + K_2}{R_1 + K_1} = \alpha. \tag{35}$$

Figure 20A:
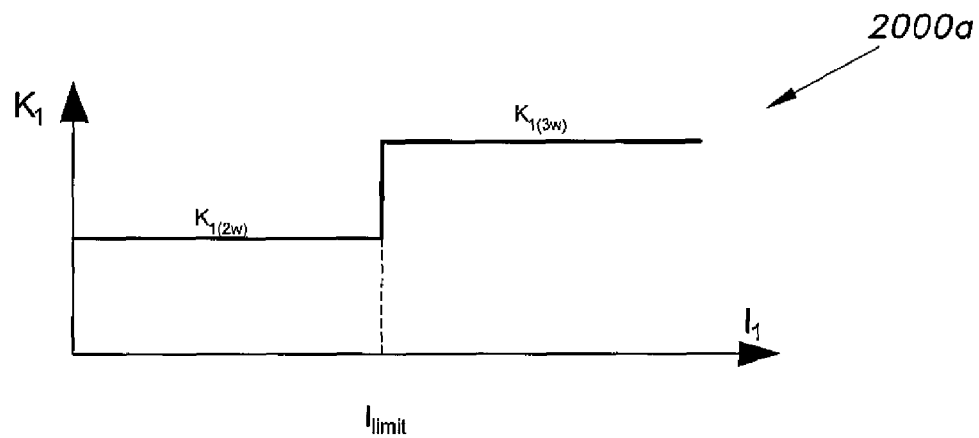
FIG. 20A is a plot showing variation of the droop gain $K_1$ of FIG. 19.
Figure 20B:
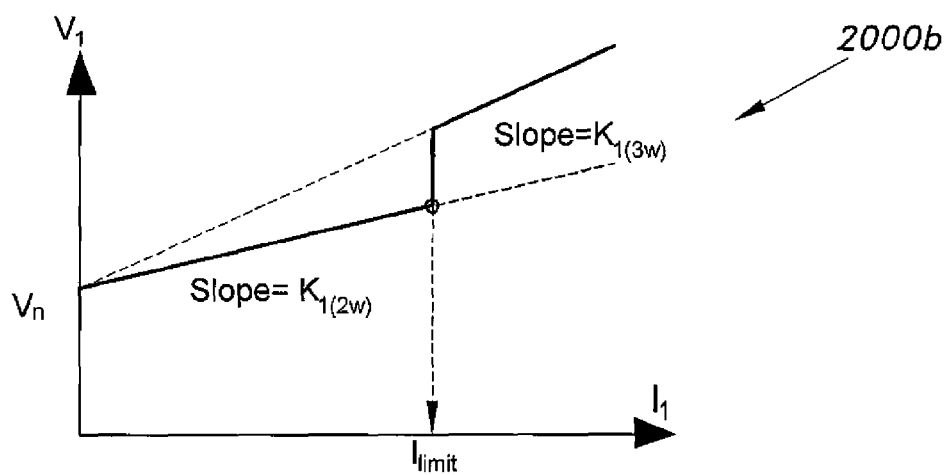
FIG. 20B is a plot showing voltage-current characteristic for the VSC1 of FIG. 17.

Under two-wire mode, the equivalent resistance of $R_1$ is 2R, while under three-wire mode, it equals $[(k+2)/(k+1)]R$. Hence, switching between two-wire and three-wire modes entails changing $K_1$ accordingly to maintain same power ratio, $\alpha$. The switching from two-wire to three-wire mode, which depends mainly on the line current magnitude, causes the equivalent line resistance to decrease. Hence $K_1$ should be increased. Based on this criterion, the relation between the droop gain constant of line 1, $K_1$, and the corresponding line current is shown in plot 2000a of FIG. 20A, while the corresponding voltage-current characteristic is given as shown in plot 2000b of FIG. 20B. If it is assumed that the thermal current limit for the conductors is $I_{limit}$, for any current less that this limit, two-wire mode is activated, and hence, the droop gain constant is set to $K_{1(2w)}$. For currents higher than this limit, the droop gain is increased to $K_{1(3w)}$.

A new approach for converting high voltage AC lines into bipolar high voltage DC systems has been presented with a power enhancement of 27% compared to the conventional two-wire bipole HVDC system. A further increase in the power enhancement up to 37% can be achieved by reducing the resistance of the modulating pole (if possible). Despite this power penalty, the present scheme has no series-connected power-electronic based converter connected to the modulating pole and has a lower number of high-voltage control switches when compared with a TWBS with current-regulated converter. Hence, system reliability is increased with a lower overall cost. The operational procedure of the present structure has been illustrated in details under steady-state intervals and transition intervals. During the transition intervals, switched series resistor steps are used to ensure smooth variation of pole currents to avoid di/dt stresses. The corresponding bypass switches have a relatively low voltage rating (a few kV). The design steps of different steps of this switched series resistors has been also introduced. An expression for the average power loss in the resistor steps has also been presented. It is found that the average power loss in the switched resistors is insignificant compared to the total line losses. A limiting resistor is also used during the transition interval to limit the line capacitance discharging current. The present system has been simulated using Matlab/Simulink, under different operational modes. The simulation results validate the present concept.

It is to be understood that the present invention is not limited to the embodiments described above, but encompasses any and all embodiments within the scope of the following claims.

We claim:

1. A method of converting high voltage AC lines into bipolar high voltage DC systems, the high voltage AC lines including three transmission lines designated as a positive pole, a negative pole, and a modulating pole, comprising the steps of:

providing a system for converting high voltage AC lines into bipolar high voltage DC systems, the system comprising:

three transmission lines designated as a positive pole, a negative pole, and a modulating pole;

a first switch ($S_g$) having an ($S_g$) pole and an ($S_g$) throw;

a second switch ($S_r$) having an ($S_r$) pole and an ($S_r$) throw, the ($S_r$) pole being connected to the ($S_g$) throw, the ($S_r$) throw being connected to an input of the negative pole transmission line, the ($S_g$) pole being connected to an input of the positive pole transmission line;

a current limiting resistor ($R_{Limit}$);

a plurality of step resistors ($R_{st1}$, $R_{st2}$ ..., $R_{stn}$) connected in series, the ($R_{stn}$) resistor having a terminal lead connected to an input of the modulating pole, the ($R_{st1}$) resistor having a terminal lead connected to the limit resistor ($R_{Limit}$), and the current limiting resistor ($R_{Limit}$) having a terminal lead connected to the ($S_r$) pole-($S_g$) throw connection;

a bypass switch ($S_L$) selectively shunting the limit resistor ($R_{Limit}$), bypass switches ($S_{st1}$, $S_{st2}$..., Sstn) selectively shunting corresponding resistors ($R_{st1}$, $R_{st2}$ ..., $R_{stn}$);

a plurality of diodes ($D_r$) connected in series, the series of diodes having an anode end connected to an output of the negative pole transmission line and a cathode end connected to an output of the modulating pole transmission line;

a plurality of diodes ($D_g$) connected in series, the series of diodes having an anode end connected to the output of the modulating pole transmission line and a cathode end connected to an output of the positive pole transmission line; and a controller sequencing switching of the switches ($S_g$), ($S_r$), ($S_L$), and ($S_{st1}$, $S_{st2}$ ..., Sstn), wherein the sequencing controller includes:

i) means for opening switches ($S_g$) and ($S_r$) when the source current is at or below the rated thermal current limit of the positive pole and negative pole transmission lines, the circuit then being operated in two-wire mode with no current flowing through the modulating pole transmission line;

ii) means for operating in three-wire-mode when the source current is above the rated thermal current limit, the circuit alternating between a first state and a second state;

iii) means for configuring switch ($S_g$) in a closed position and switch ($S_r$) in an open position during the first state, the flow of source current to a connected grid being divided between the positive pole transmission line and the modulating pole transmission line, and current returning from the grid to the source being carried only by the negative pole transmission line, the first state having a duration based on a length of time the transmission lines can safely carry the source current given the rated thermal current limit;

iv) means for configuring switch ($S_g$) in an open position and switch ($S_r$) in a closed position during the second state, the flow of source current to the connected grid being solely through the positive pole transmission line, but current returning from the grid to the source being split between the modulating pole transmission line and the negative pole transmission line;

v) means for successively inserting and removing the step resistors ($R_{st1}$, $R_{st2}$ ..., $R_{stn}$) connected to the modulating pole transmission line using corresponding switches ($S_{st1}$, $S_{st2}$ ..., $S_{stn}$) during a transient period between the first and second states in order to provide for a smooth transition in current;

vi) means for initiating the means for successively inserting the step resistors ($R_{st1}$, $R_{st2}$ ..., $R_{stn}$) during a transition period from the first state to the second state to gradually decrease the current of the modulating pole transmission line;

vii) means for inserting the limit resistor ($R_{Limit}$) during the transition period from the first state to the second state;

viii) means for removing the limit resistor ($R_{Limit}$) during a transition period from the second state to the first state; and ix) means for initiating the means for successively removing the step resistors ($R_{st1}$, $R_{st2}$ ..., $R_{stn}$) during the transition period from the second state to the first state to gradually increase the current of the modulating pole transmission line;

wherein a positive terminal of the bipolar high voltage DC output is formed at the output of the positive pole transmission line and a negative terminal of the bipolar high voltage DC output is formed at the output of the negative pole transmission line;

operating the transmission lines in two-wire mode when current supplied by a power source is up to a rated thermal current limit of the transmission lines, the current being carried to a load in the positive pole and returned from the load to the power source in the negative pole, the modulating pole being unused and left open; and operating the transmission lines in three-wire mode when current supplied by a power source exceeds the rated thermal current limit of the transmission lines, the three-wire mode alternating between a first state and a second state, the first state including the step of switching the positive pole and the modulating pole into parallel configuration to divide current delivered from the power source to the load between the positive pole and the modulating pole for a period of time 0.5 T where T is a length of time a pole may carry current higher than limit current without exceeding a maximum permissible temperature of the transmission line, current being returned to the power source only through the negative pole, the second state including the step of switching the modulating pole and the negative pole into parallel configuration to divide current returned from the load to the power source between the modulating pole and the negative pole for a period of time 0.5T, the current being delivered from the power source to the load solely in the positive pole.

2. The method of converting high voltage AC lines into bipolar high voltage DC systems according to claim 1, wherein the root mean square (rms) current of the positive and negative poles, $I_1$ and $I_2$, are equal, being characterized by the relation:

$$I_{1(rms)} = I_{2(rms)} = \sqrt{\frac{1}{2}(I^2 + 0.25I^2)} = 0.79I,$$

while the rms current of the modulating pole is characterized by the relation:

$$I_{3(rms)} = 0.5I.$$

3. The method of converting high voltage AC lines into bipolar high voltage DC systems according to claim 2, wherein the rms currents of the positive and the negative pole are set equal to their thermal limit, the result being characterized by the relation:

$$I_{1(rms)} = I_{2(rms)} = 0.79 I = I_L, \quad\quad 5$$

where, $I_L$ is the thermal limit of the lines.

4. The method of converting high voltage AC lines into bipolar high voltage DC systems according to claim 3, wherein the method provides power transfer increase of approximately 27% over a bipolar structure without exceeding the thermal limit (IL).

5. A system for converting high voltage AC lines into bipolar high voltage DC systems, comprising:

three transmission lines designated as a positive pole, a negative pole, and a modulating pole;

a first switch ($S_g$) having an ($S_g$)$_{pole}$ and an ($S_g$) throw;

a second switch ($S_r$) having an ($S_r$) pole and an ($S_r$) throw, the ($S_r$) pole being connected to the ($S_g$) throw, the ($S_r$) throw being connected to an input of the negative pole transmission line, the ($S_g$) pole being connected to an input of the positive pole transmission line;

a current limiting resistor ($R_{Limit}$), a plurality of step resistors ($R_{st1}, R_{st2} \ldots, R_{stn}$) connected in series, the ($R_{stn}$) resistor having a terminal lead connected to an input of the modulating pole, the ($R_{st1}$) resistor having a terminal lead connected to the limit resistor ($R_{Limit}$), and the current limiting resistor ($R_{Limit}$) having a terminal lead connected to the ($S_r$) pole-($S_g$) throw connection;

a bypass switch ($S_L$) selectively shunting the limit resistor ($R_{Limit}$), switches ($S_{st1}, S_{st2} \ldots,$ Sstn) selectively shunting corresponding resistors ($R_{st1}, R_{st2} \ldots, R_{stn}$);

a plurality of diodes ($D_r$) connected in series, the series of diodes having an anode end connected to an output of the negative pole transmission line and a cathode end connected to an output of the modulating pole transmission line;

a plurality of diodes ($D_g$) connected in series, the series of diodes having an anode end connected to the output of the modulating pole transmission line and a cathode end connected to an output of the positive pole transmission line; and a controller sequencing switching of the switches ($S_g$), ($S_r$), ($S_L$), and ($S_{st1}, S_{st2} \ldots,$ Sstn), wherein the sequencing controller includes:

i) means for opening switches ($S_g$) and ($S_r$) when the source current is at or below the rated thermal current limit of the positive pole and negative pole transmission lines, the circuit then being operated in two-wire mode with no current flowing through the modulating pole transmission line;

ii) means for operating in three-wire-mode when the source current is above the rated thermal current limit, the circuit alternating between a first state and a second state;

iii) means for configuring switch ($S_g$) in a closed position and switch ($S_r$) in an open position during the first state, the flow of source current to a connected grid being divided between the positive pole transmission line and the modulating pole transmission line, and current returning from the grid to the source being carried only by the negative pole transmission line, the first state having a duration based on a length of time the transmission lines can safely carry the source current given the rated thermal current limit;

iv) means for configuring switch ($S_g$) in an open position and switch ($S_r$) in a closed position during the second state, the flow of source current to the connected grid being solely through the positive pole transmission line, but current returning from the grid to the source being split between the modulating pole transmission line and the negative pole transmission line;

v) means for successively inserting and removing the step resistors ($R_{st1}, R_{st2} \ldots, R_{stn}$) connected to the modulating pole transmission line using corresponding switches ($S_{st1}, S_{st2} \ldots, S_{stn}$) during a transient period between the first and second states in order to provide for a smooth transition in current;

vi) means for initiating the means for successively inserting the step resistors ($R_{st1}, R_{st2} \ldots, R_{stn}$) during a transition period from the first state to the second state to gradually decrease the current of the modulating pole transmission line;

vii) means for inserting the limit resistor ($R_{Limit}$) during the transition period from the first state to the second state;

viii) means for removing the limit resistor ($R_{Limit}$) during a transition period from the second state to the first state; and ix) means for initiating the means for successively removing the step resistors ($R_{st1}, R_{st2} \ldots, R_{stn}$) during the transition period from the second state to the first state to gradually increase the current of the modulating pole transmission line;

wherein a positive terminal of the bipolar high voltage DC output is formed at the output of the positive pole transmission line and a negative terminal of the bipolar high voltage DC output is formed at the output of the negative pole transmission line.

6. The system according to claim 5, wherein the switches are bidirectional semiconductor switches.

7. The system according to claim 5, wherein the switches are fast switches.

8. The system according to claim 5, wherein the resistors $R_{st1}$ through $R_{stn}$ have values according to a formula characterized by:

$$R_{stm} = \frac{2R(n+1)}{(n-m+1)} - (2R + R_{st1} + \ldots + R_{stm-1}),$$

where $R_{stm}$ is the $m^{th}$ step resistor and n is the number of resistance steps.

9. The system according to claim 5, wherein the modulating pole transmission line comprises a first wire having a resistance $R_m$ connected in parallel with a second wire having a resistance $R_m/1.732$.

10. The system according to claim 5, further comprising:

a connection of the positive pole input and the negative pole input of the three transmission lines to a two-pole undersea cable fed by an offshore wind power generating source;

a first voltage source converter (VSC) connected to the positive pole and negative pole transmission line outputs;

a connection of inputs to a bipolar transmission line to the two pole undersea cable;

a second VSC connected to outputs of the bipolar transmission line;

means for switching a droop gain constant associated with the three transmission lines from $K_{1(3w)}$ to $K_{1(2w)}$ when the three transmission line circuit is being operated in two-wire mode; and means for switching the droop gain constant from $K_{1(2w)}$ to $K_{1(3w)}$ when the three transmission line circuit is being operated in three-wire mode.

\* \* \* \* \*